(12) United States Patent
Kessler et al.

(10) Patent No.: US 9,465,662 B2
(45) Date of Patent: Oct. 11, 2016

(54) PROCESSOR WITH EFFICIENT WORK QUEUING

(75) Inventors: Richard E. Kessler, Northborough, MA (US); Aseem Maheshwari, Fremont, CA (US); Robert Sanzone, Hudson, MA (US)

(73) Assignee: Cavium, Inc., San Jose, CA (US)

( * ) Notice: Subject to any disclaimer, the term of this patent is extended or adjusted under 35 U.S.C. 154(b) by 390 days.

(21) Appl. No.: 13/274,767

(22) Filed: Oct. 17, 2011

(65) Prior Publication Data

US 2013/0097608 A1    Apr. 18, 2013

(51) Int. Cl.
G06F 9/46   (2006.01)
G06F 9/50   (2006.01)
G06F 9/48   (2006.01)

(52) U.S. Cl.
CPC .......... *G06F 9/5027* (2013.01); *G06F 9/4881* (2013.01); *G06F 2209/509* (2013.01)

(58) Field of Classification Search
None
See application file for complete search history.

(56) References Cited

U.S. PATENT DOCUMENTS

| | | | |
|---|---|---|---|
| 5,809,526 A * | 9/1998 | Patel | 711/122 |
| 6,513,057 B1 * | 1/2003 | McCrory | G06F 9/4881 710/6 |
| 7,320,037 B1 | 1/2008 | Maturi et al. | |
| 2004/0088439 A1 | 5/2004 | Lee et al. | |
| 2005/0100042 A1 | 5/2005 | Illikkal | |
| 2006/0056406 A1 * | 3/2006 | Bouchard et al. | 370/389 |
| 2006/0168418 A1 * | 7/2006 | Adusumilli | 711/169 |
| 2006/0227811 A1 | 10/2006 | Hussain et al. | |

OTHER PUBLICATIONS

"Notification of Transmittal of the International Search Report and the Written Opinion of the International Searching Authority, or the Declaration" from International Application No. PCT/US2012/056059 mailed on Dec. 4, 2012.

International Preliminary Report on Patentability dated Apr. 22, 2014 for PCT/US2012/056059 entitled "Processor With Efficient Work Queuing".

* cited by examiner

*Primary Examiner* — Sisley Kim
(74) *Attorney, Agent, or Firm* — Hamilton, Brook, Smith & Reynolds, P.C.

(57) ABSTRACT

Work submitted to a co-processor enters through one of multiple input queues, used to provide various quality of service levels. In-memory linked-lists store work to be performed by a network services processor in response to lack of processing resources in the network services processor. The work is moved back from the in-memory inked-lists to the network services processor in response to availability of processing resources in the network services processor.

40 Claims, 6 Drawing Sheets

PROCESSOR WITH EFFICIENT WORK QUEUING

BACKGROUND

In most operating systems, an input queue is used in operating system scheduling and distribution of processing resources. The input queue typically includes a collection of work to be performed and is often handled by removing outgoing work from a head end of the queue and adding any incoming work to a tail end of the queue. Depending on the operating system, various techniques may be used to handle the work stored in an input queue. For example, techniques such as First-Come-First-Serve, Round-robin scheduling, priority and custom scheduling, etc. may be used. Regardless of the queuing and scheduling technique used by an operating system, a queuing delay may occur while the work to be performed awaits execution in the queue.

SUMMARY

A network services processor, according to certain embodiments, includes a plurality of network services processor elements that perform work comprising packet processing operations and a plurality of in-memory linked-lists. Each separate packet processing operation may define a piece of work. The in-memory linked-lists store work to be performed by the network services processor elements in response to a lack of processing resources in the network services processor elements. The work is moved back from the in-memory linked-lists to the network services processor elements in response to availability of processing resources in the network services processor elements.

In some embodiments, the in-memory linked-lists may be formed in a portion of network services processor memory independent of portions describing and processing the work to be performed. The in-memory linked-lists may include a dynamic random access memory. The work to be performed may be stored in an input queue of an in-memory linked-list. The network services processor may maintain a plurality of pointers to a plurality of available storage locations in the in-memory linked-lists. The work to be performed may be stored at an available storage location indicated by a pointer. The network services processor may store the work to be performed at a tail of an input queue of the available storage location. The network services processor may update a second pointer pointing to the tail of the input queue with the pointer.

In certain embodiments, the network services processor may retrieve the work to be performed from an available storage location in response to availability of processing resources in the network services processor. The network services processor may retrieve the work to be performed from a head of an input queue of the available storage location. The network services processor may free the pointer upon retrieval of the work to be performed. The network services processor may update a second pointer pointing to the head of the input queue with a new pointer obtained from the retrieved work.

In some embodiments, the network services processor may maintain a plurality of pointers to available storage locations in the in-memory linked-lists in a free pool allocator. The free pool allocator may be maintained in a dynamic random access memory. The network services processor may obtain a pointer to an available storage location in the in-memory linked-lists from the free pool allocator in response to lack of processing resources in the network services processor.

In certain embodiments, the work to be performed by the network services processor may be packed into a buffer of predetermined size prior to being stored in an in-memory linked-list. The work to be performed by the network services processor may be unpacked to separate packets upon being moved back from the in-memory linked-lists to the network services processor.

In some embodiments, the network services processor may maintain a work queue entry for each piece of work. The network services processor may maintain a predetermined number of pointers to available storage space in the in-memory linked-lists. The predetermined number of pointers may be a subset of an overall number of work queue entries maintained by the network services processor.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Before describing example embodiments of the present invention in detail, an example network security processor in which the embodiments may be implemented is described immediately below to help the reader understand the inventive features of the present invention.

Figure 1:
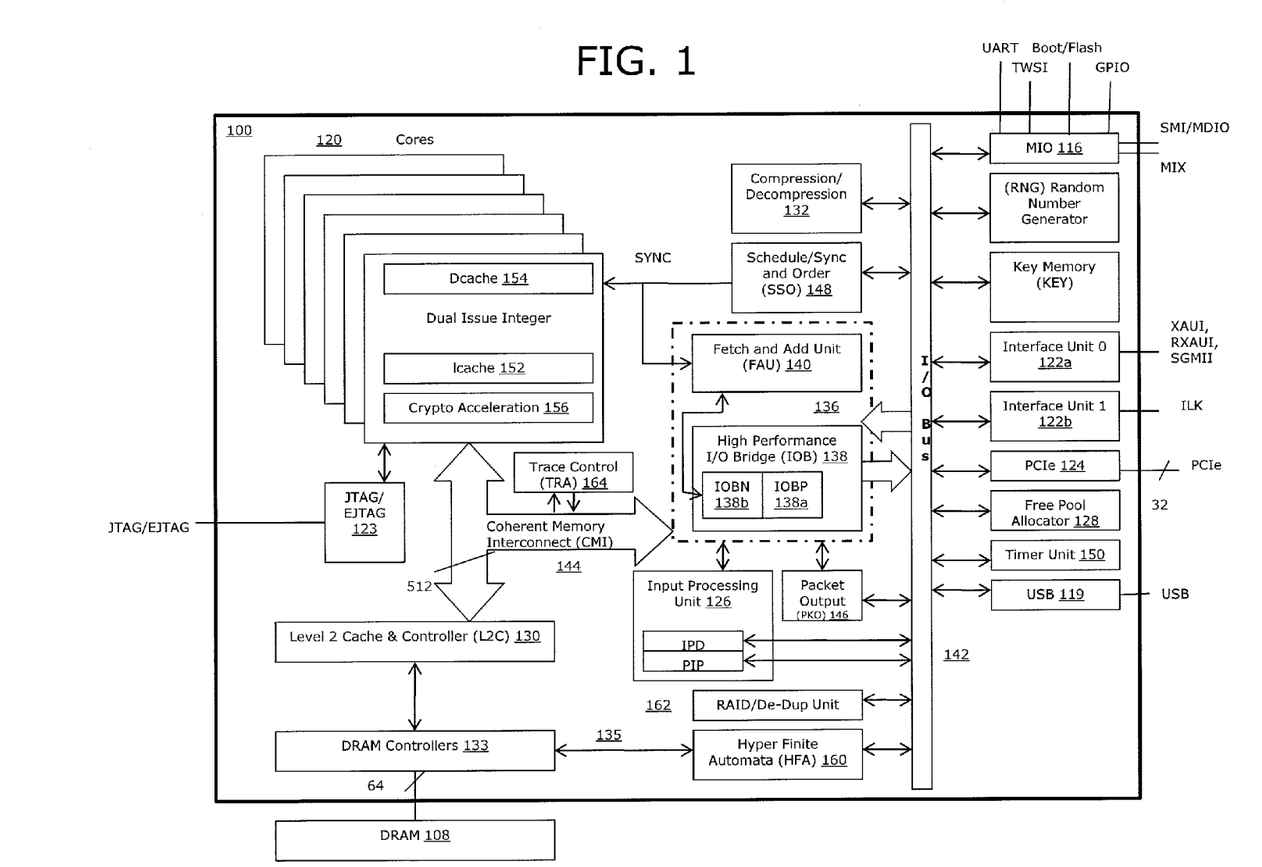
FIG. 1 is a block diagram of a network services processor.

FIG. 1 is a block diagram illustrating a network services processor 100. The network services processor 100 delivers high application performance using at least one processor core 120. The various elements of the network services processor 100 described below are referenced hereinafter collectively as "network services processor elements" or "processor elements."

The network services processor 100 processes Open System Interconnection network L2-L7 layer protocols encapsulated in received packets. As is well-known to those skilled in the art, the Open System Interconnection (OSI) reference model defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communications between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by a plurality of interface units 122. A packet can also be received by a PCIe interface 124. The interface unit 122 performs pre-processing of the received packet by checking various fields in the L2 network protocol header included in the received packet and then forwards the packet to a packet input unit 126. At least one interface unit 122a can receive packets from a plurality of X Attachment Unit Interfaces (XAUI), Reduced X Attachment Unit Interfaces (RXAUI), or Serial Gigabit Media Independent Interfaces (SGMII). At least one interface unit 122b can receive connections from an Interlaken Interface (ILK).

The packet input unit 126 performs further pre-processing of network protocol headers (e.g., L3 and L4 headers) included in the received packet. The pre-processing includes checksum checks for TCP/User Datagram Protocol (UDP) (L3 network protocols).

A free-pool allocator 128 maintains pools of pointers to free memory in Level-2 cache memory 130 and external DRAM 108. The packet input unit 126 uses one of the pools of pointers to store received packet data in Level-2 cache memory 130 or external DRAM 108 and another of the pools of pointers to allocate work queue entries for the processor cores 120.

The packet input unit 126 then writes packet data into buffers in Level-2 cache 130 or external DRAM 108. Preferably, the packet data is written into the buffers in a format convenient to higher-layer software executed in at least one of the processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets. Other embodiments of co-processing units include the RAID/De-Dup Unit 162, which accelerates data striping and data duplication processing for disk-storage applications.

Another co-processor is a Hyper Finite Automata (HFA) unit 160 which includes dedicated HFA thread engines adapted to accelerate pattern and/or signature matching necessary for anti-virus, intrusion-detection systems and other content-processing applications. Using a HFA unit 160, pattern and/or signature matching is accelerated, for example being performed at rates upwards of multiples of tens of gigabits per second. The HFA unit 160, in some embodiments, could include any of a Deterministic Finite Automata (DFA), Non-deterministic Finite Automata (NFA), or HFA algorithm unit.

An I/O interface 136 manages the overall protocol and arbitration and provides coherent I/O partitioning. The I/O interface 136 includes an I/O bridge 138 and a fetch-and-add unit 140. The I/O Bridge includes two bridges, an I/O Packet Bridge (IOBP) 138a and an I/O Bus Bridge (IOBN) 138b. The I/O Packet Bridge 138a is configured to manage the overall protocol and arbitration and provide coherent I/O portioning with primarily packet input and output. The I/O Bus Bridge 138b is configured to manage the overall protocol and arbitration and provide coherent I/O portioning with primarily the I/O Bus. Registers in the fetch-and-add unit 140 are used to maintain lengths of the output queues that are used for forwarding processed packets through a packet output unit 146. The I/O bridge 138 includes buffer queues for storing information to be transferred between a coherent memory interconnect (CMI) 144, an I/O bus 142, the packet input unit 126, and the packet output unit 146.

The miscellaneous I/O interface (MIO) 116 can include auxiliary interfaces such as General Purpose I/O (GPIO), Flash, IEEE 802 two-wire Management Data I/O (MDIO), Serial Management Interface (SMI), Universal Asynchronous Receiver-Transmitters (UARTs), Reduced Gigabit Media Independent Interface (RGMII), Media Independent Interface (MII), two wire serial interface (TWSI) and other serial interfaces.

The network services provider 100 may also include a Joint Test Action Group ("JTAG") Interface 123 supporting the MIPS EJTAG standard. According to the JTAG and MIPS EJTAG standards, a plurality of cores within the network services provider 100 will each have an internal Test Access Port ("TAP") controller. This allows multi-core debug support of the network services provider 100.

A Schedule/Sync and Order (SSO) module 148 queues and schedules work for the processor cores 120. Work is queued by adding a work queue entry to a queue. For example, a work queue entry is added by the packet input unit 126 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154, and crypto-acceleration 156. In one embodiment, the network services processor 100 includes 32 superscalar Reduced Instruction Set Computer (RISC)-type processor cores 120. In some embodiments, each of the superscalar RISC-type processor cores 120 includes an extension of the MIPS64 version 3 processor core. In one embodiment, each of the superscalar RISC-type processor cores 120 includes a cnMIPS II processor core.

Level-2 cache memory 130 and external DRAM 108 are shared by all of the processor cores 120 and I/O co-processor devices. Each processor core 120 is coupled to the Level-2 cache memory 130 by the CMI 144. The CMI 144 is a communication channel for all memory and I/O transactions between the processor cores 120, the I/O interface 136 and the Level-2 cache memory 130 and controller. In one embodiment, the CMI 144 is scalable to 32 processor cores 120, supporting fully-coherent Level-1 data caches 154 with write through. Preferably the CMI 144 is highly-buffered with the ability to prioritize I/O. The CMI is coupled to a trace control unit 164 configured capture bus request so software can later read the request and generate a trace of the sequence of events on the CMI.

The Level-2 cache memory controller 131 maintains memory reference coherence. It returns the latest copy of a block for every fill request, whether the block is stored in Level-2 cache memory 130, in external DRAM 108, or is "in-flight." It also stores a duplicate copy of the tags for the data cache 154 in each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a plurality of DRAM controllers 133 supports up to 128 gigabytes of DRAM. In one embodiment, the plurality of DRAM controllers includes four DRAM controllers, each of the DRAM controllers supporting 32 gigabytes of DRAM. Preferably, each DRAM controller 133 supports a 64-bit interface to DRAM 108. Additionally, the DRAM controller 133 can supports preferred protocols, such as the DDR-III protocol.

After a packet has been processed by the processor cores 120, the packet output unit 146 reads the packet data from the Level-2 cache memory 130, DRAM 108, performs L4 network protocol post-processing (e.g., generates a TCP/UDP checksum), forwards the packet through the interface units 122 or the PCIe interface 124 and frees the L2 cache memory 130/DRAM 108 used by the packet.

The DRAM Controllers 133 manages in-flight transactions (loads/stores) to/from the DRAM 108. In some embodiments, the DRAM Controllers 133 include four DRAM controllers, the DRAM 108 includes four DRAM memories, and each DRAM controller is connected to a DRAM memory. The DFA unit 160 is coupled directly to the DRAM Controllers 133 on a bypass-cache access path 135. The bypass-cache access path 135 allows the HFA Unit to read directly from the memory without using the Level-2 cache memory 130, which can improve efficiency for HFA operations.

Figure 2A:
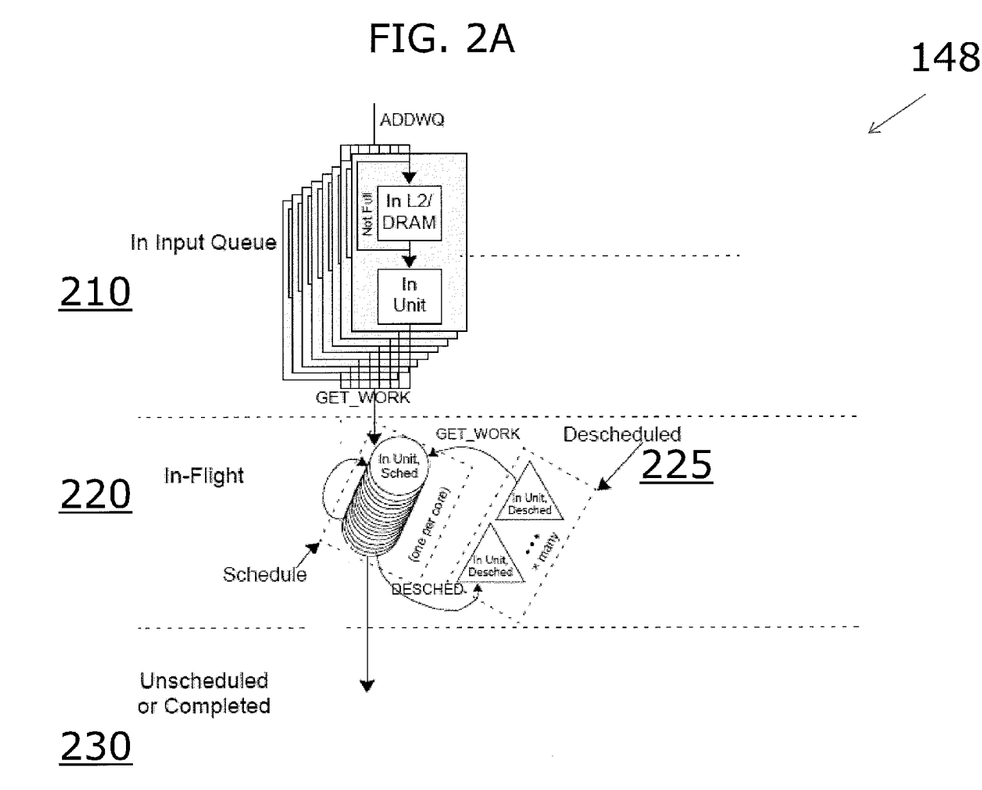
FIG. 2A is an illustration of a Schedule/Sync and Order (SSO) module.

FIG. 2A is an illustration of a Schedule/Sync and Order (SSO) module 148. The Schedule/Sync and Order (SSO) module 148 functions as a co-processor that provides important functions such as work queuing, work scheduling/de-scheduling, and ordering and synchronization of work.

Each piece of work is described by an associated work-queue entry that may be created by either hardware units (i.e., on-chip units of the network services processor 100 shown in FIG. 1) or core software (i.e., instructions executed by the on-chip units). For example, in some embodiments, a centralized packet-input hardware creates a work-queue entry and submits work for each packet arrival. Further, core software may create work-queue entries and submit work as desired.

Different levels of quality of service (QOS) may be provided by the co-processors (described earlier with reference to FIG. 1). Specifically, multiple input work queues may be used and the incoming packets may be classified into one of the multiple input work queues using default values and priorities. Further, in order to provide a desired quality of service, certain input packets may be discarded before being buffered and presented to a core. For example, a random early discard (RED) algorithm or a threshold algorithm may be used to decide when or if to discard an input packet. This discard mechanism may be configured differently for different quality of service levels.

Each piece of work is queued by adding a work queue entry to a queue. The work stored in a queue may be output using different priority levels, depending on the desired quality of service. For example, queuing schemes such as static priority and weighted round-robin may be used.

Each piece of work often flows through the states 210, 220, 230 shown in FIG. 2A. Specifically, each piece of work is first in the input queues 210, enters in-flight 220, and finally is unscheduled or completed 230. Since, at any given time, only one piece of work can be scheduled to a particular processor core 120, the number of scheduled items is limited to the number of processor cores. A processor core that is executing unscheduled work or has completed its scheduled work and has not requested new work is considered an unscheduled core. Scheduled work is a subset of the SSO in-flight work 220. Any core may de-schedule a scheduled item at any point 225. Any de-scheduled work remains in-flight and is rescheduled later.

Although the SSO unit 148 size is limited, the SSO unit 148 maintains the appearance of an infinite input work queue, by maintaining L2/DRAM (in-memory) linked-lists and overflowing to L2/DRAM when required. Specifically, in absence of processing space, the SSO unit 148 adds the input-queue entries to an L2/DRAM list maintained by network services processor 100. If space is available in the SSO unit 148 when work is added, the SSO unit 148 buffers the work internally immediately and avoids the overhead of the memory list. If the SSO unit 148 puts work in a memory list, it later automatically moves the work from L2/DRAM into the SSO unit 148 as soon as space becomes available, in the order that the work was originally added.

As described above, the SSO unit 148 queues each piece of work by adding a work queue entry to a queue. This work-queue entry in L2/DRAM is the primary descriptor that describes each piece of work. The SSO unit 148 can read/write to the L2/DRAM locations containing the work-queue entry when adding work queue entries to the queue or when moving work from a memory input queue 210 to a SSO entry in the SSO unit 148.

Typically, the SSO unit 148 only needs to maintain a work queue pointer (WQP) 300 (shown later in FIG. 2B and FIG. 3) to the work queue entry. The work-queue pointer may be a 64-bit aligned pointer into L2/DRAM that points to a legal work-queue entry. The SSO unit 148 stores the WQP and uses this pointer when a core is available for processing new work. Specifically, when a processor element of the network services processor 100 adds input queue entries 210 (AD-DWQ instruction shown in FIG. 2A) against an existing work-queue structure, the SSO unit 148 reads to the L2/DRAM locations containing the pointed-to work-queue entry.

Figure 2B:
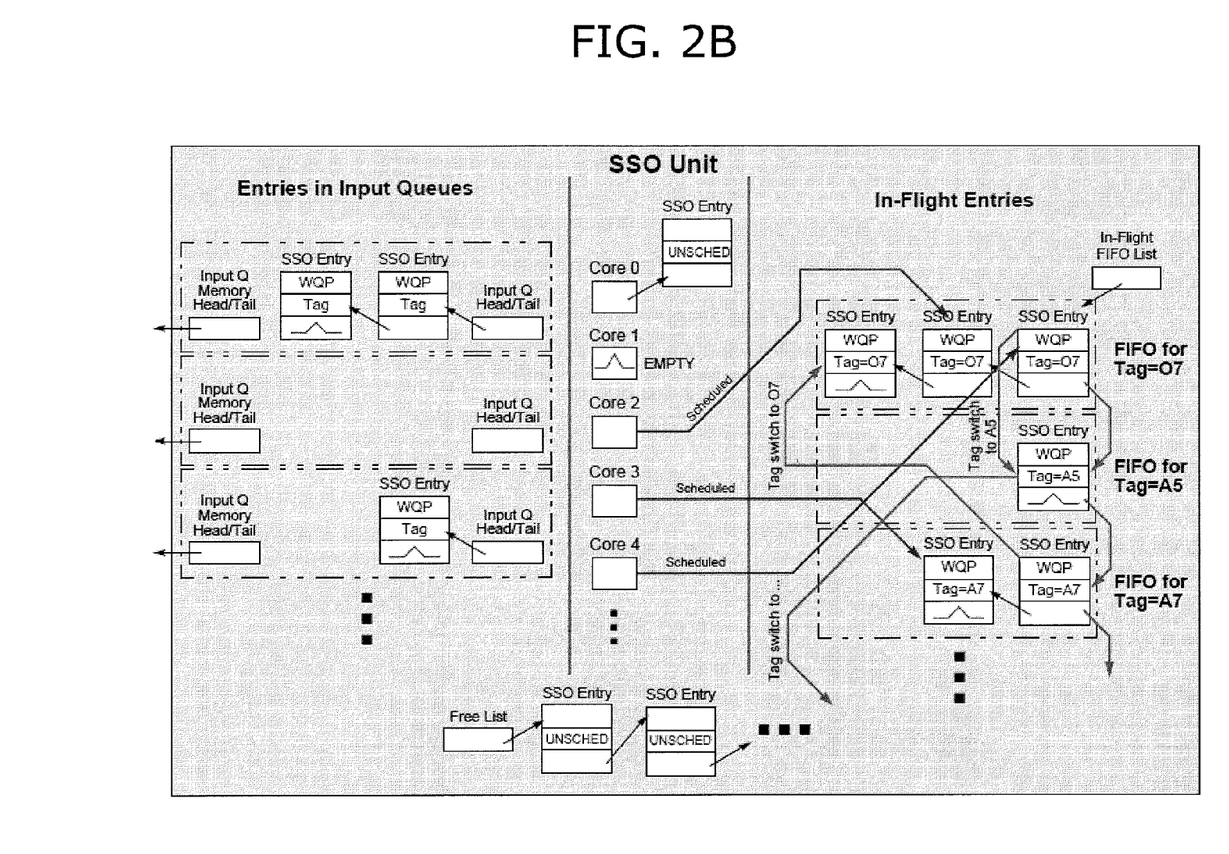
FIG. 2B is an illustration of an internal architecture of the Schedule/Sync and Order (SSO) module.

FIG. 2B is an illustration of an internal architecture of the Schedule/Sync and Order (SSO) unit 148. For illustration purposes, five hypothetical cores are shown, however, example embodiments of the present invention may employ a various number of cores.

As explained above, the SSO unit 148 entries may be in input queues 210, in-flight 220, attached to a core that is in the unscheduled state 221, or in the free list 222. Each entry to the SSO unit 148 contains at least the following information:

A pointer 300 to the work-queue entry in L2/DRAM (WQP)
The current tag 301 and tag type
The current group (shown later in FIG. 3)
Pointers 209 to link the entry into various lists In the example shown in FIG. 2B, the SSO unit 148 architecture includes multiple input queues 210. Each input queue includes a memory list and an in-unit list. As the SSO unit 148 adds new work into the unit, it allocates an internal SSO unit entry 233 and fills the entry 233 with the necessary information. Once an internal SSO entry 233 is assigned to a piece of work, the work remains in the SSO unit 148 while it is in the input queue 210 or in-flight 220 until it is completed or unscheduled. The SSO entry 233 cannot overflow to L2/DRAM after that point. Core operations only cause the SSO entry 233 to attach/detach to/from particular cores, and move between lists.

Once the SSO unit 148 loads a piece of work, it no longer reads or writes the work-queue entry locations in L2/DRAM. The work-queue entry in L2/DRAM is only used while work is in an input queue 210, but never while the work is in the SSO unit 148. The SSO unit 148 carries the work-queue pointer along at all points when it is inside the SSO unit 148, since the work-queue entry pointer indirectly describes the actual work that needs to be performed.

The in-flight entries 220 are organized in a first-in-first-out (FIFO) ordered list 244, with one FIFO entry associated with each unique in-flight tag and tag type value combination. Work enters a FIFO list 244 when the SSO hardware either schedules work from an input queue 210 or switches from the unscheduled 221 core state.

A core in the SSO unit 148 may be scheduled to process in-flight entries 220, in the unscheduled state 221 with an attached SSO entry 233, or in the free state 222.

Figure 3:
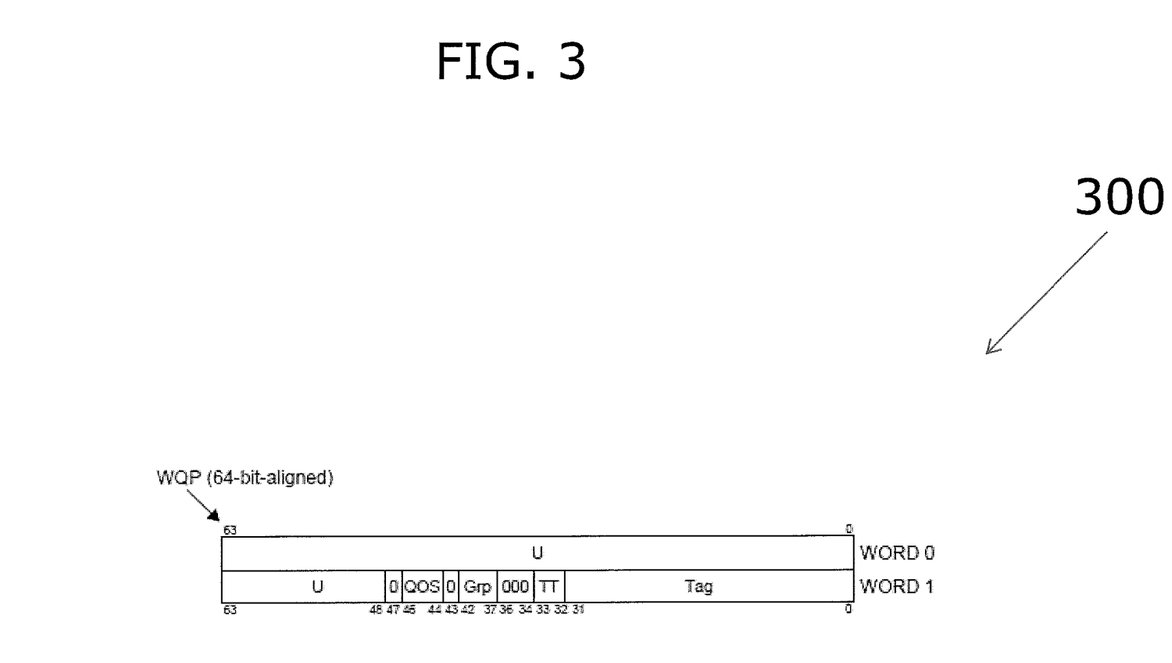
FIG. 3 illustrates format requirements for a work queue pointer.

FIG. 3 illustrates format requirements for a work queue pointer 300. The fields labeled with "QOS," "Grp," "TT," and "Tag" indicate the quality of service, group, tag type, and tag corresponding to each piece of work, respectively. The SSO hardware only reads QOS, Grp, TT fields and, as such, these fields are set appropriately by SSO software for hardware ADDWQ cases. As noted above, the SSO hardware stores the work queue pointer 300 and delivers the pointer 300 to the work when a core is available for processing work.

Figure 4:
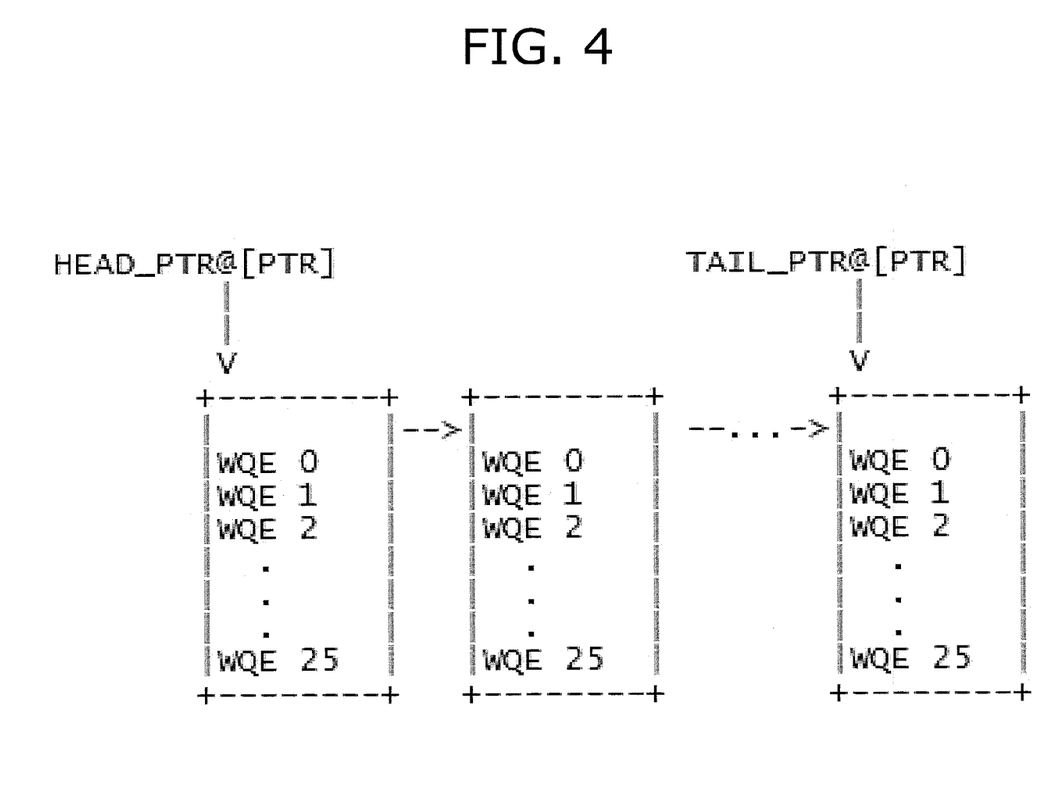
FIG. 4 is an illustration of work queue entry buffers that may be used with the present invention.

FIG. 4 is an illustration of work queue entry buffers that may be used with the present invention. As described above, work submitted to a co-processor enters through an input queue 210 (shown in FIG. 2A) and is described by an associated work-queue entry (WQE). The input work queues may be arbitrarily large.

In some embodiments, the network services processor is initialized with a free list of pointers, pointing to empty L2 cache lines. The cache lines may be arranged in bundles having predetermined sizes. For example, in one embodiment, the software initializes hardware with 8+48+roundup $$\left(\frac{N}{26}\right)$$

free pointers, where as many as N work queue entries may be used by the applications.

Some of these free pointers may be stored as on-chip registers and function as the head and tail pointers of the in-memory linked-lists. Other pointers may be stored in a free page allocator pool (FPA 128 shown in FIG. 1) in the L2/DRAM.

Upon initialization, the in-memory linked list for a given input queue is empty, and the head and tail pointers for each input queue are the same. If on-chip space is available, the hardware buffers the work internally immediately and avoids the overhead of the in-memory linked-list. In the event no space is available on chip, the SSO unit 148 directs the work to an in-memory linked-list. Specifically, if space is not available on-chip, the SSO unit 148 pre-fetches a free pointer from the FPA 128 (FIG. 1) and inserts the work queue entry (e.g., WQE 0, WQE 1, . . . ) into an internal buffer while simultaneously packing (compressing) successive incoming work pieces as queue entries (e.g., WQE 0, WQE 1, . . . ) until there is a sufficient number of work queue entries to form bit-packed bundle for storing in the L2/DRAM cache line. The SSO unit 148 stores the bit-packed bundle 410, 420, 430 (plus the free pointer) to L2/DRAM at the tail of the input queue linked-list. For faster retrieval, SSO unit 148 can choose to store the bit-packed bundle 410, 420, 430 to just the L2. Once the bit-packed bundle 410, 420, 430 is stored, a tail pointer 440 of the bundle 410, 420, 430 is updated with the free pointer. Entries held in the external input queues form linked-lists of work queue entry bundles 410, 420, 430. In certain embodiments, at least one external input queue may be included for each quality of service level. In one embodiment (shown in FIG. 4), each work queue entry bundle may contain 26 work queue entries bit-packed into a 256-byte block of memory.

Once processing space is available on chip, the hardware automatically moves the work from L2/DRAM back for processing in the order that the work was originally added. Specifically, the hardware reads the bit-packed bundle 410, 420, 430 from a head pointer 450 of the input queue linked-list in the L2/DRAM and simultaneously unpacks and decompresses the bundle 410, 420, 430. Once the bundle is unpacked, the SSO unit 148 frees the head pointer 450 back to the FPA 128 (shown FIG. 1) and updates the head pointer 450 with the next pointer retrieved from the unpacked bundle 410, 420, 430.

Figure 5:
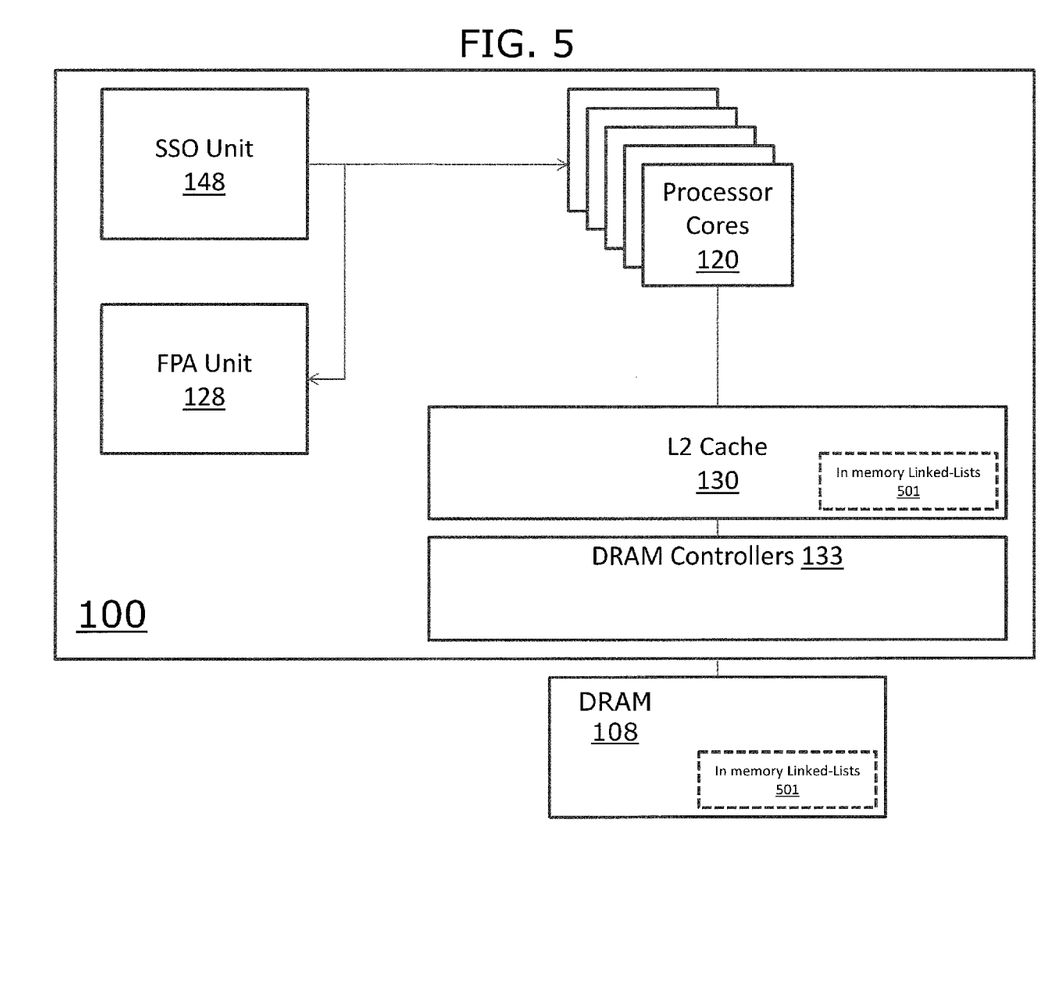
FIG. 5 is a high-level illustration of an embodiment of the present invention.

FIG. 5 is a high-level illustration of an embodiment of the present invention. As shown in FIG. 5, a network services processor 100 includes a plurality of independent processor cores 120 that perform work comprising packet processing operations and a plurality of in-memory linked-lists arranged 501 to store work to be performed by a processor core 120 in response to lack of processing resources in the processor core. The work is moved back from the in-memory linked-lists 501 to the processor core 120 in response to availability of processing resources in the processor core. The in-memory linked-lists 501 may be formed in a portion of processor core memory 120 independent of portions describing and processing the work to be performed.

The work to be performed is stored in an input queue (not shown) of an in-memory linked-list 501. The in-memory linked-lists 501 may be stored in the dynamic random access memory (DRAM) 108 or in the L2 cache 130.

As explained previously, the network services processor 100 maintains a plurality of pointers, assigned by a free pool allocator unit 128, pointing to a plurality of available storage locations in the in-memory linked-lists 501. If processing space is not available, the processor 100 pre-fetches a free pointer from the FPA 128 and inserts a work queue entry into an internal buffer (not shown). The processor 100 simultaneously packs successive work queue entries until there are sufficient work queue entries to a packed bundle of work queue entries of predetermined size. Once formed, the packed bundle is stored at a tail of an in-memory linked-list 501 in the L2 cache 130 (or the DRAM 108). After the packed bundle is stored, a tail pointer of the bundle is updated with the free pointer.

Once processing resources become available, the network services processor 100 retrieves the work to be performed from a head of the in-memory linked-lists 501 and frees the pointer pointing to the retrieved work. The pointer pointing to the head of the in-memory linked-lists 501 is also updated with a new pointer obtained from the retrieved work.

While this invention has been particularly shown and described with references to example embodiments thereof, it will be understood by those skilled in the art that various changes in form and details may be made therein without departing from the scope of the invention encompassed by the appended claims.

What is claimed is:

1. A network services processor comprising:
    a plurality of network services processor elements that perform work comprising packet processing operations;
    a plurality of in-memory linked-lists arranged to store entries indicating work to be performed by the network services processor elements; and
    a scheduling processor configured to schedule the work for the plurality of network services processor elements, the scheduling processor further configured to 1) detect availability of a processor to perform the work and 2) store the entries to the plurality of in-memory linked-lists in response to detecting a lack of an available processor to perform the work in the plurality of network services processor elements, and the scheduling processor moving the entries back from the in-memory linked-lists to a given network services processor element of the plurality of network services processor elements in response to detecting availability of a processor to perform the stored work in the plurality of network services processor elements,
    wherein the work to be performed by the network services processor is unpacked upon being moved back from the in-memory linked-lists to the network services processor.

2. The network services processor of claim 1 wherein the in-memory linked-lists are formed in a portion of network services processor memory independent of portions describing and processing the work to be performed.

3. The network services processor of claim 1 wherein the work to be performed is stored in an input queue of an in-memory linked-list.

4. The network services processor of claim 1 wherein the in-memory linked-lists include dynamic random access memory.

5. The network services processor of claim 1 wherein the network services processor maintains a plurality of pointers to a plurality of available storage locations in the in-memory linked-lists.

6. The network services processor of claim 5 wherein the network services processor stores the work to be performed at an available storage location indicated by a pointer.

7. The network services processor of claim 6 wherein the network services processor stores the work to be performed at a tail of an input queue of the available storage location.

8. The network services processor of claim 7 wherein the network services processor updates a second pointer pointing to the tail of the input queue with the pointer.

9. The network services processor of claim 5 wherein the network services processor retrieves the work to be performed from the available storage location in response to availability of a processor to perform the stored work in the plurality of network services processor elements.

10. The network services processor of claim 9 wherein the network services processor retrieves the work to be performed from a head of an input queue of the available storage location.

11. The network services processor of claim 10 wherein the network services processor frees the pointer upon retrieval of the work to be performed.

12. The network services processor of claim 10 wherein the network services processor updates a second pointer pointing to the head of the input queue with a new pointer obtained from the retrieved work.

13. The network services processor of claim 1 wherein the network services processor maintains a plurality of pointers to available storage location in the in-memory linked-lists in a free pool allocator.

14. The network services processor of claim 13 wherein the free pool allocator is maintained in a dynamic random access memory.

15. The network services processor of claim 13 wherein the network services processor obtains a pointer to an available storage location in the in-memory linked-lists from the free pool allocator in response to lack of a processor in the network services processor.

16. The network services processor of claim 1 wherein the work to be performed by the network services processor is packed into a buffer of predetermined size prior to being stored in an in-memory linked-list.

17. The network services processor of claim 1 wherein the work to be performed by the network services processor is unpacked to separate packets upon being moved back from the in-memory linked-lists to the network services processor.

18. The network services processor of claim 1 wherein each separate packet processing operation defines a piece of work.

19. The network services processor of claim 18 wherein the network services processor maintains a work queue entry for each piece of work.

20. The network services processor of claim 19 wherein the network services processor maintains a predetermined number of pointers to available storage space in the in-memory linked-lists, the predetermined number of pointers being a subset of an overall number of work queue entries maintained by the network services processor.

21. A method comprising:
    scheduling work for a plurality of network services processor elements;
    maintaining a plurality of in-memory linked-lists arranged to store entries indicating work to be performed by the plurality of network services processor elements;
    detect availability of a processor to perform the work;
    in response to detecting a lack of an available processor to perform the stored work in the network services processor elements, storing the entries to the plurality of in-memory linked-lists; and
    retrieving the work to be performed by the network services processor from the in-memory linked-lists back to the a given one of the plurality of network services processor elements in response to availability of a processor to perform the stored work in the plurality of network services processor elements; and
    unpacking the work to be performed by the network services processor upon being moved back from the in-memory linked-lists to the network services processor.

22. The method of claim 21 further including forming the in-memory linked-lists in a portion of network services processor memory independent of portions describing and processing the work to be performed.

23. The method of claim 21 further including storing the work to be performed in an input queue of an in-memory linked-list.

24. The method of claim 21 wherein the in-memory linked-lists include dynamic random access memory.

25. The method of claim 21 further including maintaining a plurality of pointers to a plurality of available storage locations in the in-memory linked-lists in the network services processor.

26. The method of claim 21 further including storing the work to be performed at an available storage location indicated by a pointer.

27. The method of claim 26 further including storing the work to be performed at a tail of an input queue of the available storage location.

28. The method of claim 27 further including updating a second pointer pointing to the tail of the input queue with the pointer.

29. The method of claim 25 further including retrieving the work to be performed from the available storage location in response to availability of a processor to perform the stored work in the network services processor.

30. The method of claim 29 further including retrieving the work to be performed from a head of an input queue of the available storage location.

31. The method of claim 30 further including freeing the pointer upon retrieval of the work to be performed.

32. The method of claim 30 further including updating a second pointer pointing to the head of the input queue with a new pointer obtained from the retrieved work.

33. The method of claim 21 further including maintaining a plurality of pointers to available storage location in the in-memory linked-lists in a free pool allocator.

34. The method of claim 33 further including maintaining the free pool allocator in a dynamic random access memory.

35. The method of claim 33 further including obtaining a pointer to an available storage location in the in-memory linked-lists from the free pool allocator in response to lack of a processor in the network services processor.

36. The method of claim 21 further including packing the work to be performed into a buffer of predetermined size prior to being stored in an in-memory linked-list.

37. The method of claim 21 further including unpacking the work to be performed to separate packets upon being moved back from the in-memory linked-lists to the network services processor.

38. The method of claim 21 wherein each separate packet processing operation defines a piece of work.

39. The method of claim 38 further including maintaining a work queue entry for each piece of work.

40. The method of claim 39 further including maintaining a predetermined number of pointers to available storage space in the in-memory linked-lists, the predetermined number of pointers being a subset of an overall number of work queue entries maintained by the network services processor.

* * * * *